(12) United States Patent
Andersson et al.

(10) Patent No.: US 6,574,427 B1
(45) Date of Patent: Jun. 3, 2003

(54) WATER HEATER COMPRISING A PLATE HEAT EXCHANGER AND A STORAGE CONTAINER FOR HEATED WATER

(75) Inventors: Sven Andersson, Hässleholm (SE); Thomas Dahlberg, Helsingborg (SE); Lars Fogelberg, Helsingborg (SE); Magnus Folkelid, Limhamn (SE); Per Rissler, Skanör (SE); Bengt-Ove Säiner, Helsingborg (SE)

(73) Assignee: SWEP International AB, Landskrona (SE)

( * ) Notice: Subject to any disclaimer, the term of this patent is extended or adjusted under 35 U.S.C. 154(b) by 0 days.

(21) Appl. No.: 10/149,700

(22) PCT Filed: Dec. 13, 2000

(86) PCT No.: PCT/SE00/02510
§ 371 (c)(1),
(2), (4) Date: Jun. 14, 2002

(87) PCT Pub. No.: WO01/44722
PCT Pub. Date: Jun. 21, 2001

(30) Foreign Application Priority Data

Dec. 15, 1999 (SE) ............................................... 9904610

(51) Int. Cl.⁷ .................... F28D 7/00; F28F 3/08
(52) U.S. Cl. .................. 392/496; 165/167; 165/164; 392/465
(58) Field of Search ........................ 392/465, 495, 392/496; 165/140, 164, 165, 166, 167, 186

(56) References Cited

U.S. PATENT DOCUMENTS

| | | | | |
|---|---|---|---|---|
| 5,193,612 A | * | 3/1993 | Stirnkorb | 165/167 |
| 5,462,113 A | * | 10/1995 | Wand | 165/167 |
| 5,913,361 A | * | 6/1999 | Engstrom et al. | 165/70 |
| 6,378,603 B1 | * | 4/2002 | Shimoya et al. | 165/153 |
| 6,394,179 B1 | * | 5/2002 | Blomgren et al. | 165/167 |

* cited by examiner

Primary Examiner—Teresa Walberg
Assistant Examiner—Thor Campbell
(74) Attorney, Agent, or Firm—Breiner & Breiner, L.L.C.

(57) ABSTRACT

A container (2) adapted to avoid peak temperatures of water delivered from a heat exchanger (1) is provided with interior reinforcing means (9–11, FIG. 1; 13–13''', FIGS. 5–18) connecting opposite parts of the wall (2') of the container (2). Even with a thin container wall this makes it possible to use a box shaped container design without risk of deformations due to variations in the water pressure. The reinforcing means may consist of stacked interconnected plates (13–13''')—e.g. having the same form and size as plates (12–12'') used in a plate heat exchanger connected to the container (2).

5 Claims, 7 Drawing Sheets

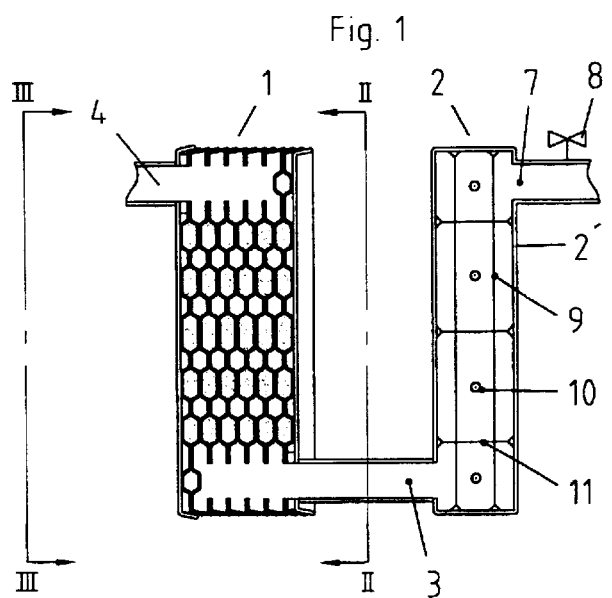
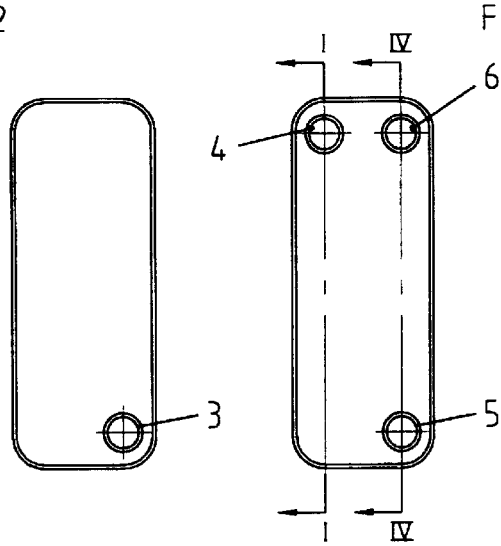
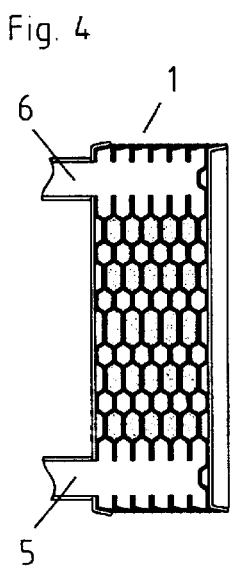

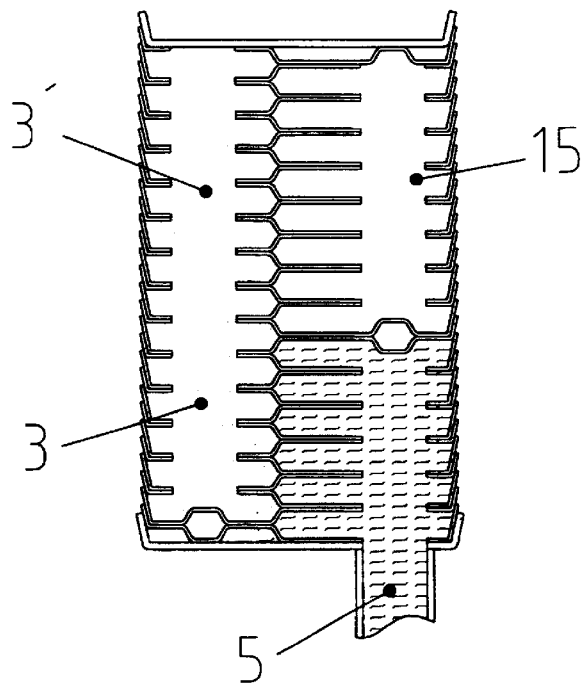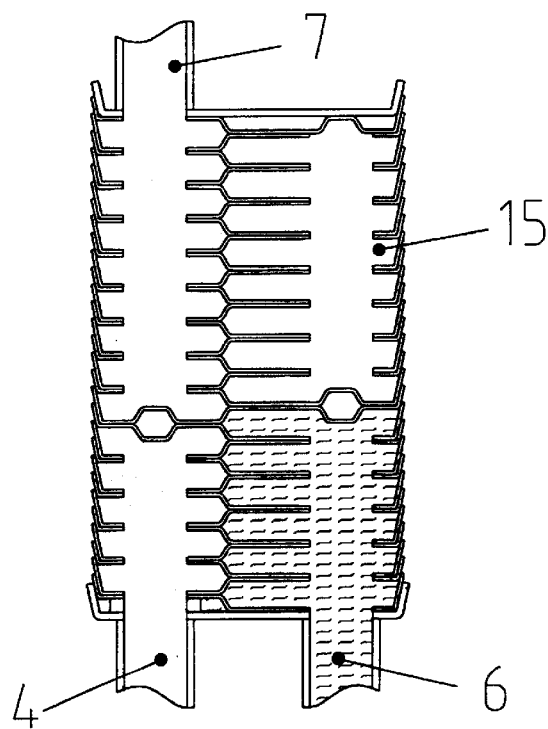

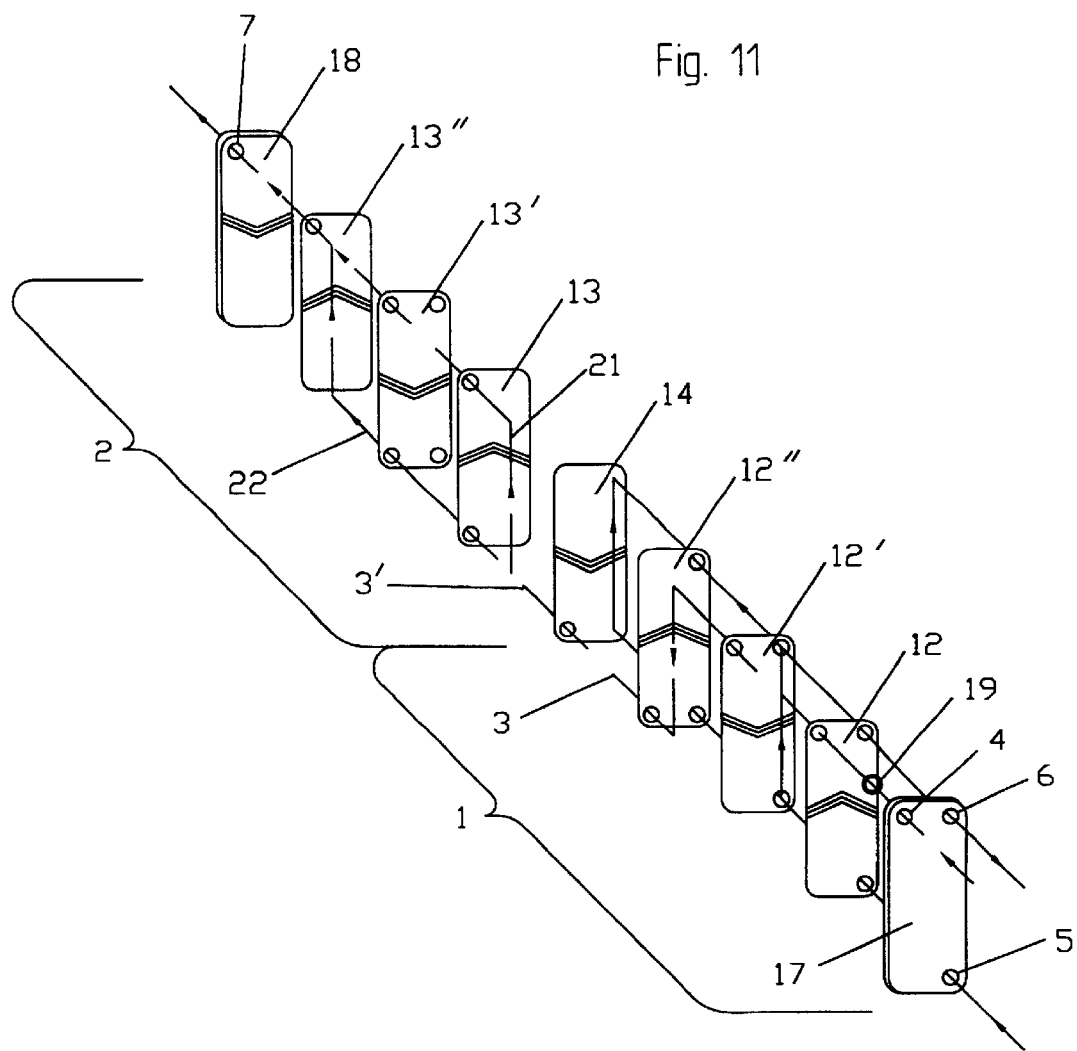

WATER HEATER COMPRISING A PLATE HEAT EXCHANGER AND A STORAGE CONTAINER FOR HEATED WATER

The present invention relates to a water heater comprising a plate heat exchanger and a storage container for heated water.

Hot water, in particular sanitary water, is often obtained by passing cold water through a plate heat exchanger to which a hot fluid is supplied in a secondary circuit. For household use the temperature at the tap should be kept constant e.g. between 55 and 60° C. In many applications it is desired to heat the water directly in accordance with the flow needed so as to avoid unnecessary storing. However, some storage is unavoidable viz. the amount of water in the plate heat exchanger and the tubing to the taps. The use of plate heat exchangers makes it possible to obtain an efficient heat exchange and to supply a great mass flow of heated water with a minimum of storage volume. A problem inherent in the system is that if hot water has been tapped for some time followed by a short interval without flow, a new hot water flow will cause the temperature of the first amount of water to become substantially higher than desired. Hot water supplied at a temperature above 60° C. may be dangerous if used e.g. for washing babies. The high water temperature is due to the fact that the fluid heating the water in the plate heat exchanger must have a temperature 10–20° C. higher than the desired temperature of the water to be tapped. When the flow through the heat exchanger is stopped the sanitary water present in the exchanger will be heated to the temperature of the heating fluid in the exchanger. For reasons of safety a storage container for the hot water could be provided between the heat exchanger and the taps. A long tubing between the exchanger and the taps may constitute such container. However, such tubing may not be practical to provide and is certainly not desired as the first amount of water delivered to a tap after no use of hot water during a long period will be rather cold.

Therefore, it is desired to provide a water heater which has a small volume, but still prevents peak temperatures of the hot water when starting tapping after a short stop interval following a longer tapping period. Besides a small volume the water heater should also have small outer dimensions. In most cases the use of spherically shaped containers is impossible and other shapes may be deformed by the comparatively high water pressures which may occur. The use of heavy walled containers is prohibited for cost reasons.

A water heater comprising a plate heat exchanger and a storage container for heated water, the said storage container being provided with an outer limiting wall, an exit opening for delivery of the heated water and reinforcing means adapted to interconnect opposite parts of the wall for force transmitting in three directions perpendicular to each other is according to the invention characterized in that said reinforcing means in the storage container are stacked plates provided with ridges and depressions and are interconnected by brazing, soldering, welding or gluing, the said plates being provided with openings forming channels through which heated water may flow.

Such reinforcing means make it possible to design the container with extremely thin walls, and still allow high internal pressures without deformations. The container is not bound to be of spherical or cylindrical shape.

Preferably the container may be designed with the same outer shape and size as that of the heat exchanger in two directions perpendicular to each other—making it possible to mount it e.g. as a continuation of the plate heat exchanger.

The container could be designed as a conventional two-circuit liquid to liquid plate heat exchanger in which only one circuit is used. However, both circuit passages could be used advantageously, if at least one plate therein is shaped to provide a connection between the two circuits.

Most preferably the container could be designed so as to form an integral part of the plate heat exchanger supplying the heated water to be stored in the container.

The invention will be described in more detail reference being made to the accompanying drawings in which FIG. 1 illustrates the basic principle of the present invention and is a vertical section through a water heater showing the principle of operation used in water heaters according to the invention, the section being taken along the line I—I of FIG. 3.

FIG. 2 is a right hand side end view of plate heat exchanger part of the water heater shown in FIG. 1 seen in the direction of the arrows II—II of FIG. 1.

FIG. 3 is a left hand side end view of FIG. 1 seen in the direction of the arrows III—III in FIG. 1.

FIG. 4 is vertical section along the line IV—IV in FIG. 3.

FIGS. 9 and 10 show sections along the lines IX—IX resp. X—X of FIG. 7.

FIG. 11 is an exploded, perspective view of the water heater illustrated in FIGS. 5 to 10 showing the working principle of the device.

Figure 5:
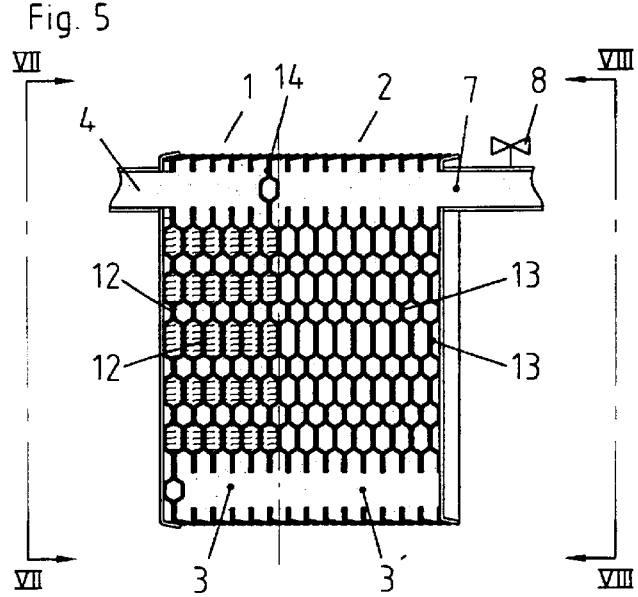
FIG. 5 is a section along the line V—V in FIG. 7 showing an embodiment of a water heater according to the invention in which a container for heated water has been integrated with a plate heat exchanger.

The FIGS. 1—4 show the general operating principle used in the present invention. In FIG. 1 a plate heat exchanger has been designated by an arrow 1 and is connected to a storage container 2 by a tube 3. The heat exchanger 1 is of the known two-circuit plate type having an inlet 4 for a fluid to be heated—in the actual case a sanitary flow of water. The heated water leaves the heat exchanger 1 via the tube 3. The heating is obtained by exchanging heat with a hot water circuit having an inlet 5 and an outlet 6 shown in FIGS. 3 and 4. The storage container 2 has an outer limiting wall 2' provided with an outlet tube 7 governed by a valve 8. The inlet 4 to the circuit of sanitary water in the pate heat exchanger 1 is connected e.g. to the urban water works system 1. The hot water circuit includes a boiler—not shown—connected to the inlet 5 and the outlet 6 of the heat exchanger 1.

During operation of the system—i.e. when sanitary water is tapped by opening the valve 8—cold sanitary water enters the heat exchanger 1 via the inlet 4 and is fed to the container 2 after being heated from e.g. 10° C. to 55° C. Simultaneously the flow of heating hot water may enter the inlet 5 of the heat exchanger 1 at a temperature of 80° C. and leave the outlet 6 at a temperature of 65° C. In case the tapping of hot sanitary water is stopped for a period of e.g. a few minutes and then restarted, the sanitary water contained inside the heat exchanger 1 during the period when there is no flow of sanitary water will leave the exchanger 1 at a temperature which could be as high as 70° C. This would be harmful if used directly to wash human beings—especially small children. Therefore, the container 2 has been provided between the heat exchanger 1 and the valve 8. The volume of the container 2 should be sufficiently great to hold the quantity of sanitary water necessary to avoid the peak in temperature. The space available will normally be used most economically by shaping the container 2 as a box having the same height and width as that of the heat exchanger 1. Due to the great variations in the interior pressure a box shaped container will become detrimentally deformed unless provided with a very thick wall. This is impossible from an economic point of view. According to the present invention the wall 2' of the container 2 may be very thin because opposite wall parts of the box shaped container 2 according to the invention have been interconnected by reinforcing means 9, 10, and 11 able to transmit force in three directions perpendicular to each other. The reinforcing means are shown schematically only.

According to the invention the reinforcing of the container wall 2' is established by providing the container 2 with interior stacked plates having pressed patterns of ridges and depressions and brazed, soldered or glued together—in a way similar to the traditional way of manufacturing plate heat exchangers. The container 2 is preferably given the same outer dimensions as that of the heat exchanger 1 in two directions and it may therefore be manufactured as a continuation of the heat exchanger 1.

An embodiment of this type of water heater has been shown in FIGS. 5 to 10 and the flow principle is illustrated in FIG. 11. The water heater shown in FIGS. 5 to 10 is an integrated heat exchanger 1 and container 2. FIG. 5 is a section along the line V—V of FIG. 7, which in turn is a left hand end view of FIG. 5 in the direction of the arrows VII—VII in FIG. 5. The section of FIG. 5 shows the flow of sanitary water entering the heat exchanger part 1 via the inlet 4 and flowing downwards between pairs of heat exchanger plates 12 to a manifold space 3 connected to a corresponding manifold space 3' at the bottom of the container part 2. The sanitary water is now passing upwards between pairs of plates 13 and will leave the container part 2 via an outlet 7 provided with a valve 8. A separating plate 14 prevents the flow of sanitary water from passing directly from the inlet 4 to the outlet 7.

Figure 6:
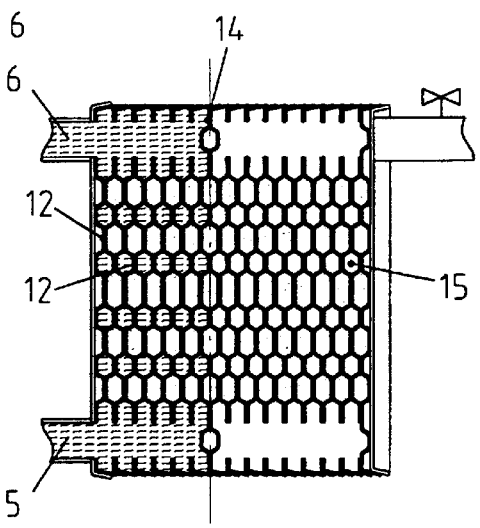
FIG. 6 is a section along the line VI—VI in FIG. 7.
Figure 7:
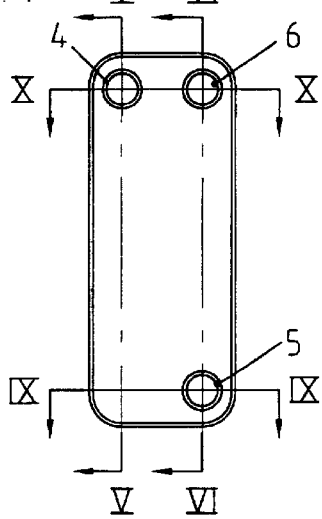
FIG. 7 is a left hand end view of the device of FIG. 5 seen in the direction of the arrows VII—VII in FIG. 5.
Figure 8:
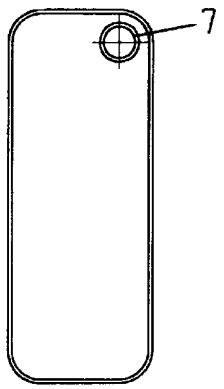
FIG. 8 is a right hand end view of the device shown in FIG. 5 seen in the direction of the arrows VIII—VIII of FIG. 5.
Figure 12:
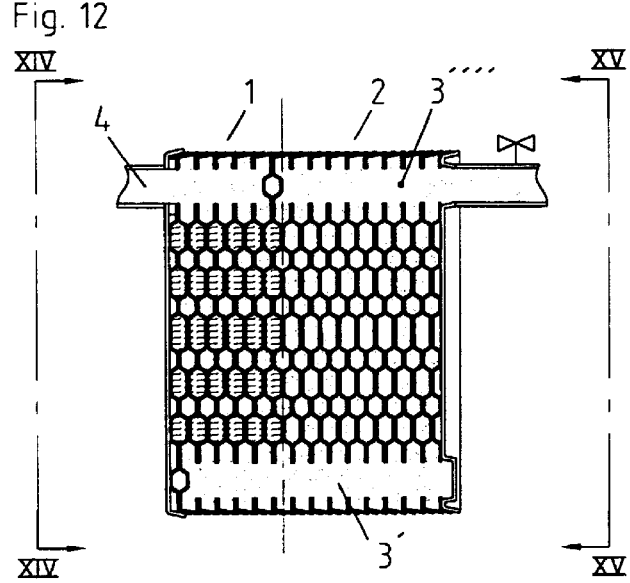
FIG. 12 is a vertical section through a further embodiment of the invention, the section following the line XII—XII of FIG. 14.
Figure 13:
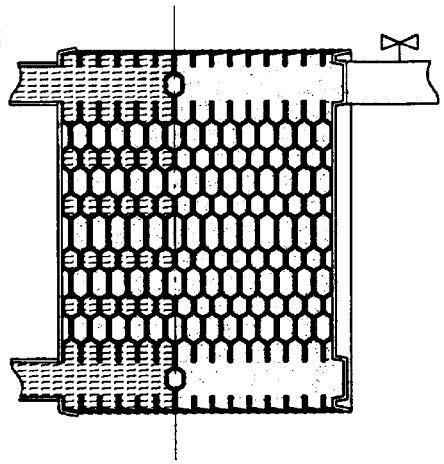
FIG. 13 is a section through the same device along the line XIII—XIII of FIG. 14.
Figure 14:
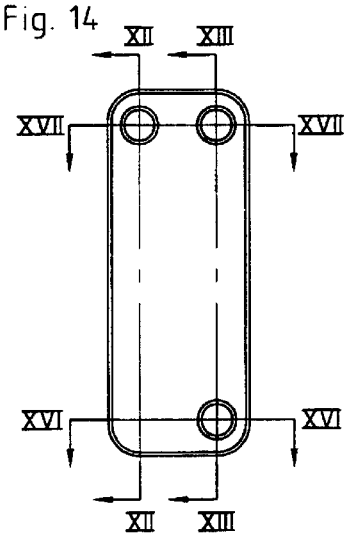
FIG. 14 is a left hand side end view of the device shown in FIG. 12 seen in the direction of the arrows XIV—XIV of FIG. 12.
Figure 15:
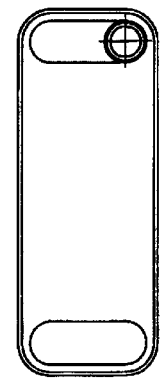
FIG. 15 is a right hand side end view of the device of FIG. 12 seen in the direction of the arrows XV—XV in FIG. 12.

FIG. 6—which is a section through the inlet 5 and the outlet 6 for the heating medium of the heat exchanger 1, said section being taken along the line VI—VI of FIG. 7—illustrates the circuit of heating medium entering via the inlet 5, flowing upwards between pairs of plates 12 and leaving the exchanger 1 via the outlet 6. The plate 14 will separate the heat exchanger 1 from the container 2 by preventing the heating medium from entering void spaces 15 in the container 2.

FIGS. 9 and 10 which are sections along the lines IX—IX resp. X—X in FIG. 7 show the outlet 6 for the heating medium resp. the inlet 4 and the outlet 7 for sanitary water as well as the inlet 5 for the heating medium. Also the void volumes 15 are shown.

FIG. 11 shows how an end plate 17, a stack of plates 12, 12', 12" and the separating plate 14 form the heat exchanger 1 part according to FIGS. 5–10, while the separating plate 14, a stack of plates 13, 13', 13" and an end plate 18 form the container part 2. The end plate 17 is provided with an inlet 4 for the cold sanitary water, an inlet 5 for the heating medium and an outlet 6 for the heating medium. The space between the end plate 17 and the first heat exchanging plate 12 is not used and a ring 19 serves as a channel for the flow of sanitary water. The space between the first heat exchanger plate 12 and the following plate 12' in the stack is blocked from passage of sanitary water, but allows passage of heating medium entering the exchanger 1 via the inlet 5. The sanitary water is flowing downwards between the plate 12' and an adjacent plate 12" and leaves the exchanger via the outlet manifold part 3 and enters the container via a manifold part 3'. The spaces between the plates 12 and 12' resp. 12" and 14 are open for upwards flow of heating medium which leaves the heat exchanger via the outlet 6. In FIG. 11 the heat exchanger plates are indicated as being provided with herring bone patterns which are traditional in plate heat exchangers.

The plates of the container part 2 of the water heater shown in FIGS. 5 to 11 are also provided with such pattern, but they have no heat exchanging purpose. However, it is advantageous to provide even the plates inside the container 2 with the same herring bone pattern—partly because a low number of different types of plates is more economic, partly because the reinforcing effect in three directions perpendicular to each other is easily obtained in the container 2 when brazing the pattern provided plates together.

A first part 21 of the hot sanitary water leaving the exchanger part 1 and entering the container 2 at 3' will now pass upwards in a channel between the separating plate 14 and the first plate 13 of the container 2, while a second part 22 of the hot sanitary water will pass upwards between the plates 13' and 13"—i.e. each other channel between the plates of the container part 2. The said second part 22 of the sanitary water rejoins the flow 21 before leaving the container part 2 via the outlet 7. The remaining channels in the container part 2—i.e. the channel between the plates 13 and 13' and the channel between the plates 13" and 18 are blocked from entry of any medium. Thus the heat exchanger part 1 of the water heater operates as an ordinary two flow plate heat exchanger, whereas the container part 2 serves as a distributor for the flow of heated sanitary water dividing it and rejoining it prior to leaving the container 2 via the outlet 7. This will ensure that temperature peaks are avoided and it will operate in such a way that there will be no risk of accumulations of permanently non-flowing sanitary water.

A still further improvement of the container part 2 of the water heater is illustrated by the embodiment of FIGS. 12 to 18. Here, the object is to utilise the whole volume of the container 2 for dividing the flow of sanitary water exiting the heat exchanger 1.

Figures 16, 17:
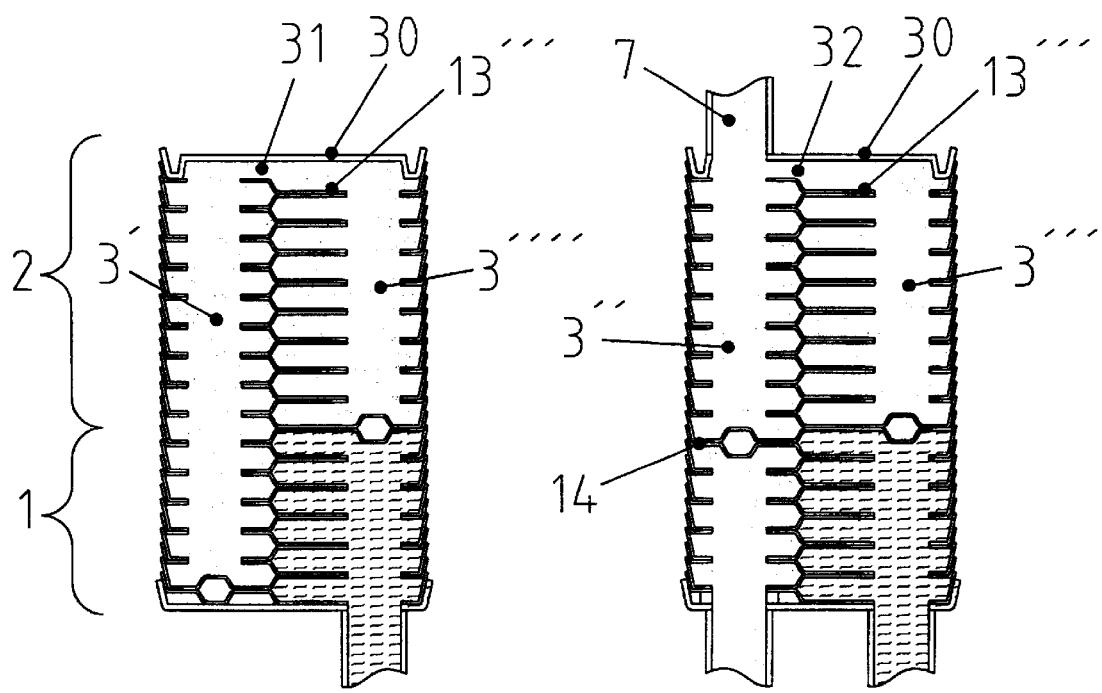
FIG. 16 is a section along the line XVI—XVI of FIG. 14.
FIG. 17 is a section along the line XVII—XVII of FIG. 14.
Figure 18:
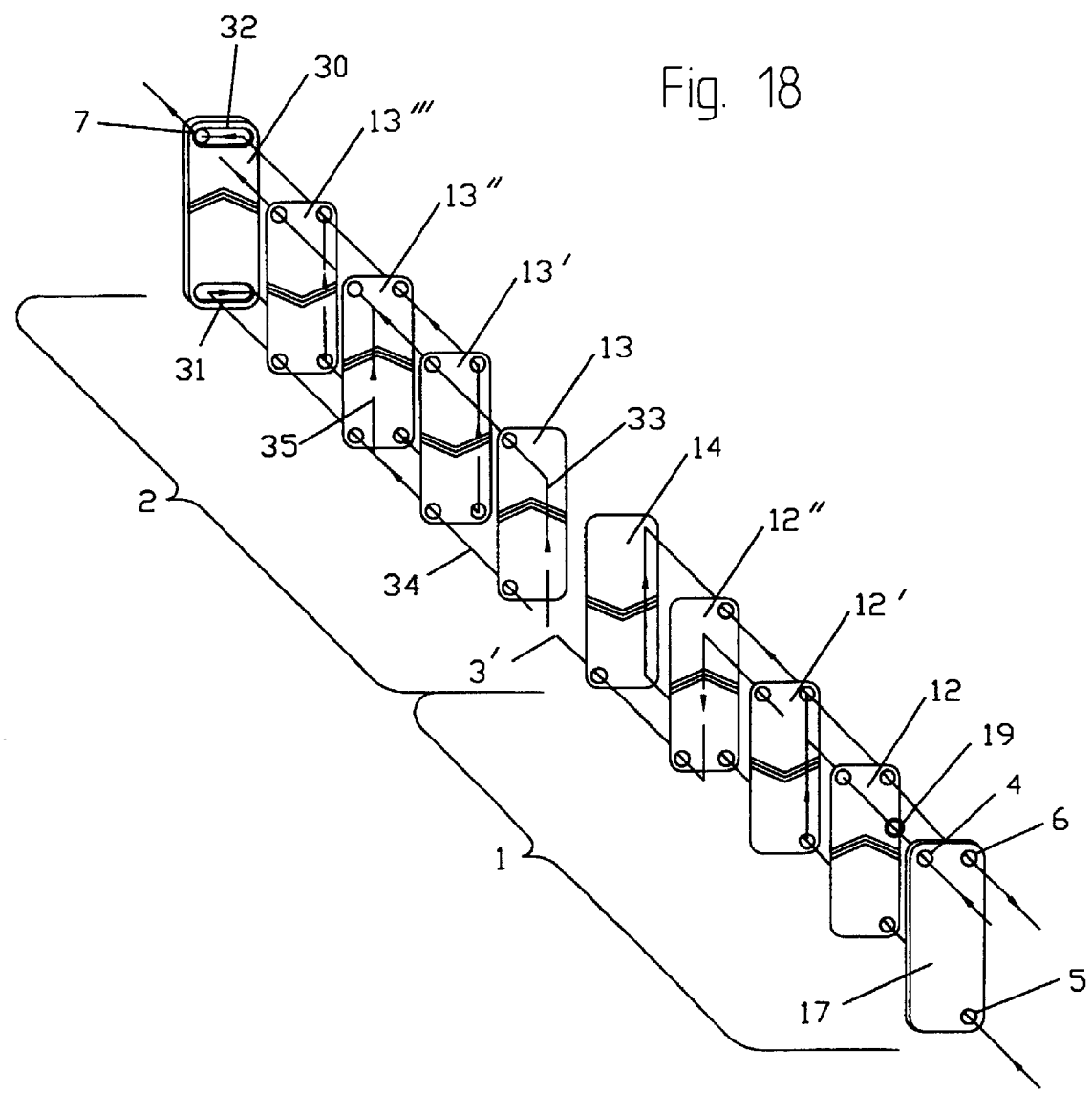
FIG. 18 is an exploded, perspective view of the water heater illustrated in FIGS. 12 to 17 showing the working principle of the device.

The heat exchanger part 1 is the same as that described above and shown in FIGS. 5 to 11, but an end plate 30 of the container part 2 has been designed so as to provide—together with an adjacent plate 13'''—channels 31 and 32 connecting pairs of manifold channels through the container at its bottom and top as will be explained later. The sanitary water entering the container part 2 at 3' moves upwards between each other channel formed by the plates in the container part 2. However—as shown in FIGS. 16 and 18—the channel 31 allows also a flow of sanitary water to pass upwards through the remaining channels in the container part 2. The upward flows of sanitary water through the container part 2 are united in parallel manifolds 3" and 3'''—see FIG. 17—and finally rejoined via the channel 32 before exiting the container 2 via the outlet 7.

It will appear from FIG. 18 that the flow of hot sanitary water entering the container part 2 at the manifold part 3' will be divided into a first flow 33 and a second flow 34. The first flow 33 will pass upwards between the separating plate 14 and the first plate 13 in the container part 2. It continues directly through the container 2 to the outlet 7 via the manifold 3"—as shown in FIG. 17. The second flow 34 continues through the manifold 3', but a flow part 35 is branched off and will pass upwards between plates 13' and 13" Here, it will reach the manifold 3 " and rejoin the first flow 33. The remains of the second flow 34 will pass through the channel 31 and will be returned in the direction towards the heat exchanger 1 via a manifold 3""—see FIG. 16—and pass upwards through the container part 2 to the manifold 3''' via the remaining channels—i.e. the channels between the plates 13'''–13" and 13'–13. The sanitary water flow from the manifold 3''' will leave the container 2 via the channel 32 to the outlet 7.

It will be understood that for reasons of clarity the FIGS. 11 and 18 have not been shown with the number of plates shown in the corresponding FIGS. 5–10 resp. FIGS 11–17.

It will also be understood that the water heater according to FIGS. 11–18—although being the more costly one—could be preferred as having the best performance in relation to its cost of manufacture.

What is claimed is:

1. A water heater comprising a plate heat exchanger and a storage container for heated water, said storage container being provided with an outer limiting wall, an exit opening for delivery of the heated water and reinforcing means adapted to interconnect opposite parts of the wall for force transmission in three directions perpendicular to each other, wherein said reinforcing means comprises stacked plates provided with ridges and depressions and are interconnected by brazing, soldering, welding or gluing, said plates being provided with openings forming channels constructed and arranged for heated water flow.

2. A water heater according to claim 1, wherein the storage container has an outer shape and size which, in two perpendicular directions, are substantially equal to a corresponding shape and size of the heat exchanger.

3. A water heater according to claim 2, wherein the storage container is a two-circuit liquid to liquid plate heat exchanger in which only one circuit is used.

4. A water heater according to claim 2, wherein said plate heat exchanger is constructed and arranged as a two-circuit liquid to liquid plate heat exchanger having one end plate shaped to provide connections between the two circuits.

5. A water heater according to claim 1, 2, 3 or 4, wherein the storage container is integral with the plate heat exchanger.

* * * * *